Feb. 17, 1942.  G. D. KROUSE  2,273,274
FILM MAGAZINE
Filed Dec. 19, 1938    2 Sheets-Sheet 1

George D. Krouse
INVENTOR
BY Victor J. Evans & Co.
ATTORNEYS

WITNESS

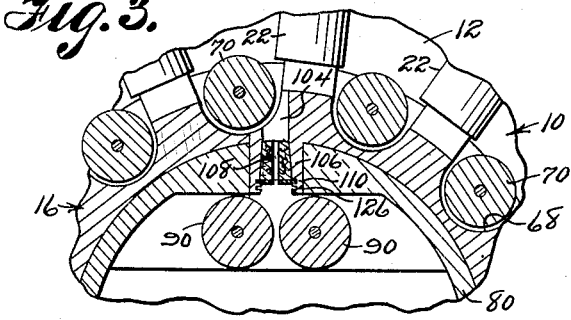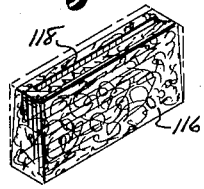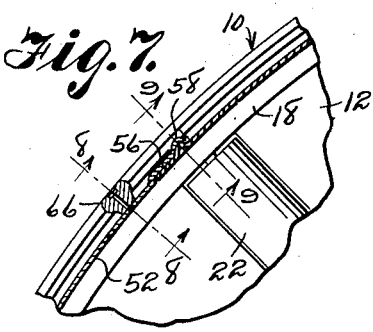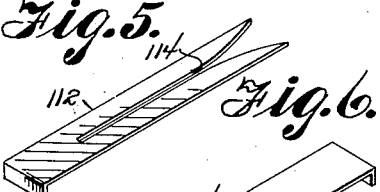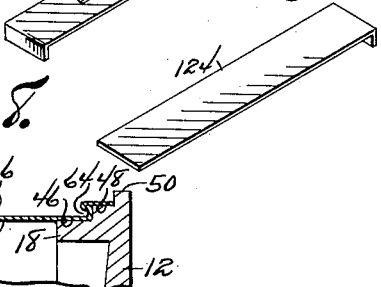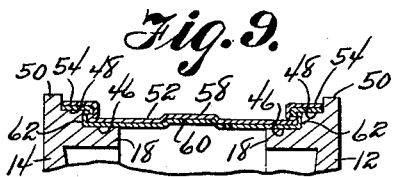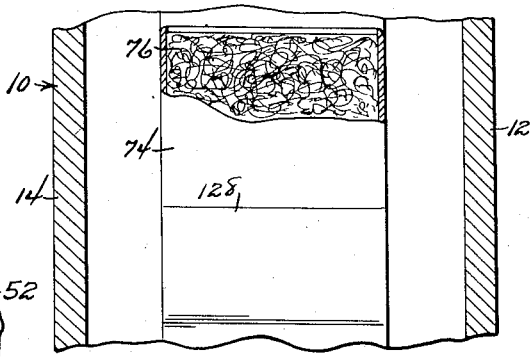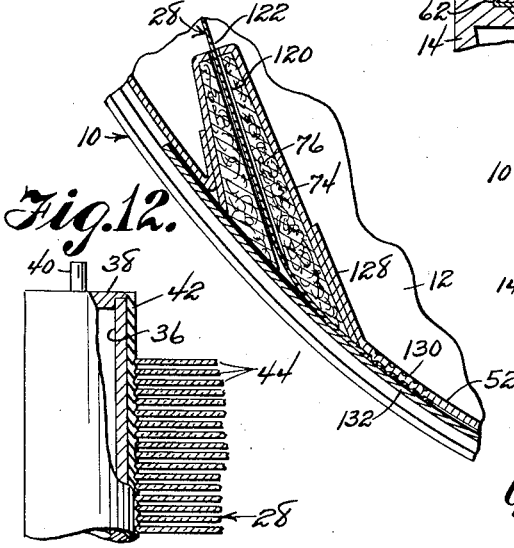

Patented Feb. 17, 1942

2,273,274

UNITED STATES PATENT OFFICE 2,273,274

FILM MAGAZINE

George D. Krouse, Winter Park, Fla.

Application December 19, 1938, Serial No. 246,728

4 Claims. (Cl. 88—18.7)

My invention relates to the handling of film such as is employed for motion picture purposes, and has among its objects and advantages the provision of an improved film magazine for use in connection with either cameras or projectors.

An object of my invention is to provide a film magazine which is loaded with film at the place of manufacture or finishing, in which the magazine is designed to provide a light-proof and protective housing for the film and in which the film may be effectively unwound from the magazine and simultaneously wound thereon during exposure or projection of the film. The exposed or projected film will be completely wound inside the magazine after which the unit may be transported to the developing facilities or the film exchange.

A further object is to provide a film magazine in which the film is convoluted inside the magazine and in which novel means are incorporated to facilitate withdrawal of the convoluted film in an easy and effective manner and at the same time permitting return of the film to the magazine for convoluted storage therein and without the necessity for reversal by rewinding.

In the accompanying drawings:

Figure 3 is an enlarged sectional view along the line 3—3 of Figure 2;

Figure 4 is a perspective view of a portion of the film exit;

Figure 5 is a perspective view of a plug mask employed in connection with the exit element of Figure 4;

Figure 6 is a perspective view of a cover mask also employed in connection with the exit;

Figure 7 is a sectional detail view of the cover latch for the magazine;

Figure 8 is a sectional view along the line 8—8 of Figure 7;

Figure 9 is a sectional view along the line 9—9 of Figure 7;

Figure 10 is an enlarged sectional view of the film entrance;

Figure 11 is a sectional view along the line 11—11 of Figure 1; and

Figure 12 is a fragmentary sectional view of one of the magazine rollers illustrating the manner in which the film is convoluted between a plurality of such radial rollers, and the manner in which the film edges are separated and supported by the bulging of the rubber surfaces of said rollers.

Figures 1, 2:
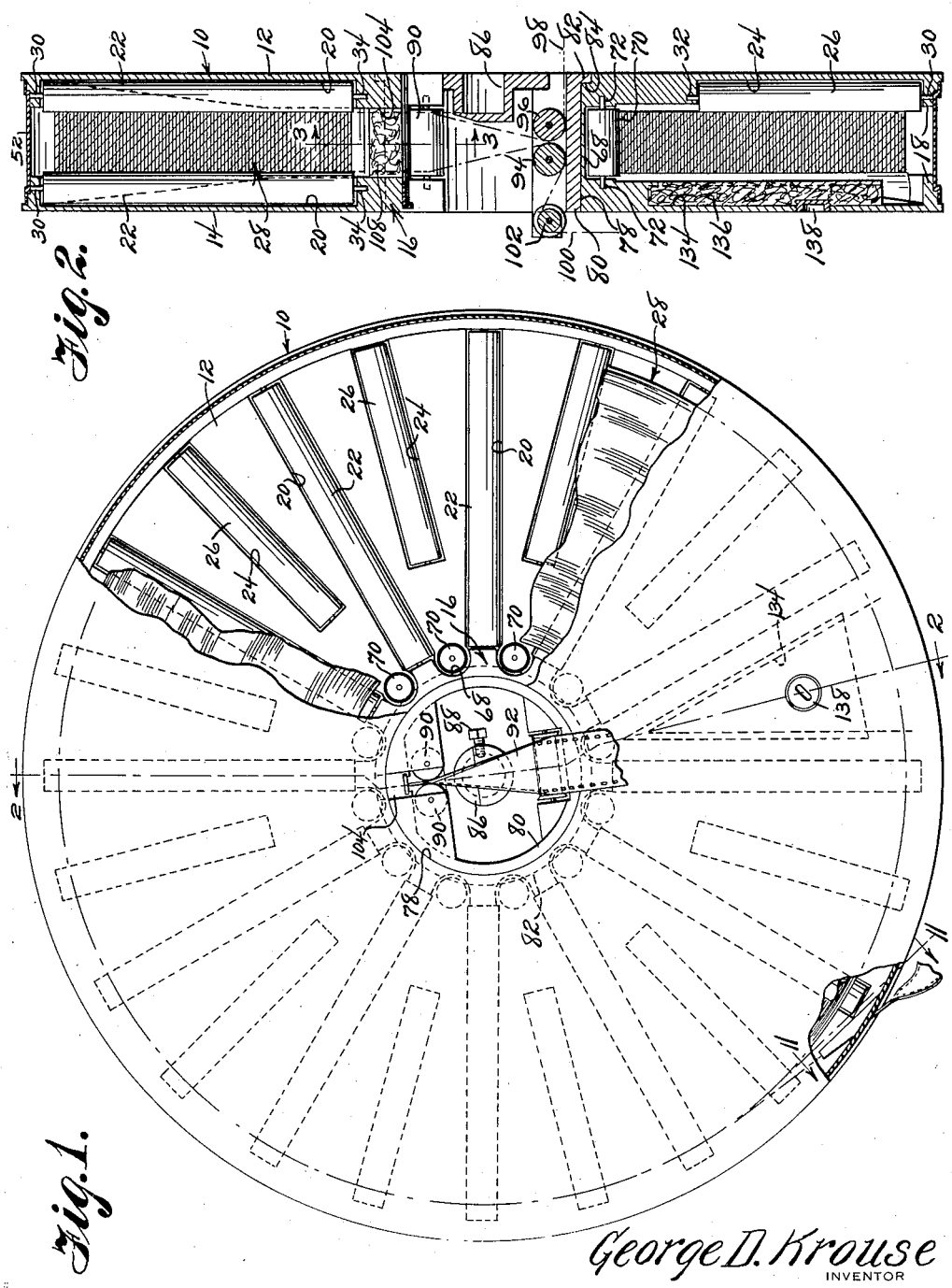
Figure 1 is a side elevational view partly in section of the magazine in accordance with my invention.
Figure 2 is a sectional view along the line 2—2 of Figure 1.

In the embodiment selected to illustrate my invention, I make use of a magazine 10 which comprises side walls 12 and 14 and a central hub 16. Side walls 12 and 14 are arranged in spaced and parallel relation and each wall includes an inwardly extending peripheral flange 18. Side walls 12 and 14 are also provided with radially aligned semi-circular grooves 20 for substantially housing radial rollers 22. Shorter semi-circular grooves 24 are also provided in the inner faces of the walls 12 and 14 to substantially house radial rollers 26 somewhat shorter than the rollers 22. According to Figure 2, the rollers 22 and 26 project slightly beyond the inner faces of the walls 12 and 14 and are so spaced as to provide accommodation for the convoluted film 28.

Each of the long rollers 22 and the short rollers 26 has its outer end rotatably journaled at 30 in one of the peripheral flanges 18, while the short rollers 26 are rotatably journaled at 32 in one end wall of their respective grooves 24. The inner ends of the long rollers 22 are rotatably journaled at 34 in the hub structure 16. Figure 12 illustrates the specific construction of the rollers 22 and 26. The roller of Figure 12 includes an aluminum tube 36 provided with end plugs 38, only one of which is illustrated, each provided with a shaft 40 for rotatably mounting the roller. Tube 36 is enclosed in a rubber tube 42 relatively fixed thereto so as to afford a frictional and cushioning surface against which the edges of the film convolutions 44 bear, making spaced indentations therein.

Referring to Figures 8 and 9, the peripheral flanges 18 have offset faces 46 and 48, while the walls 12 and 14 have flanges 50 extending beyond the faces 48. A cover 52 lies on the faces 46 and is provided with offset flanges 54 which lie on the faces 48. The cover is in the nature of a split band with its ends overlapping, as at 56. Figure 9 illustrates the overlapping ends, the lower of which is provided with an upstanding projection 60 receivable within the recess 58 in the outer overlapping end. The outer overlapping end conforms in general contour to the end thereunderneath and is bent to provide laterally extending flanges 62 which fit in the groove formation 64 in the lower end. The flanges 62 fit snugly in the grooves 64 and are slidable therein so that the overlapping ends of the cover may be effectively latched when brought together in the manner of Figure 9, at which time the projection 60 snaps into the recess 58 for effectively connecting the cover ends. The cover has close fitting relation with the faces 46 and 48 so as to have light tight relation with the flanges 18. The cover may be provided with a knob 66 to facilitate connection and disconnection of the cover from the flanges.

In Figure 1, I illustrate the hub structure 16 as being provided with grooves 68 which extend longitudinally of the hub structure and at right angles to the grooves 20 and 24. Rollers 70 are disposed within the grooves 68 and have their peripheral surfaces projecting slightly beyond the general hub structure. The rollers 70 are identical in construction with the roller illustrated in Figure 12 with respect to rubber covering. Figure 2 illustrates the rollers 70 as being rotatably journaled at 72 in the hub structure 16. Rollers 70 are arranged in circular formation, as illustrated in Figure 1, to provide a core upon which the film 28 is convoluted. Cover 52 is provided with a well 74 provided with light sealing material 76 constituting an entrance for the film 28, see Figure 10. Well 74 is substantially tangentially arranged with respect to the outer circumference of the film convolutions.

Hub structure 16 includes a central bore 78 within which I press a bushing 80 having a flange 82 lying in a recess 84 in the outer face of the wall 12. Bushing 80 is provided with a socket 86 for the reception of an axle or support (not shown). The socket is provided with a set screw 88 for fixedly relating the hub to the axle so that the magazine may be revolved in the same manner as existing spool reels for loading and unloading purposes. Under such conditions, the cover 52 is removed. Bushing 80 is provided with a pair of spaced rollers 90 between which the exit end 92 of the film is threaded. The exit end constitutes the inside convolution of the film wound on the rollers 70 between the two sets of rollers 22 and 26. Bushing 80 also carries two rollers 94 and 96 between which the film end 92 is threaded. Under some conditions the film end 92 is withdrawn horizontally, as at 98, in which event the film is moved over the roller 96. In other cases the film might be withdrawn vertically, as at 100, in which event the film end 92 is pulled over the roller 94 and over a roller 102 located so as to hold the vertical run of the film in slightly spaced relation with the wall 14. It will be noted that the film end 92 is twisted ninety degrees about its longitudinal axis between the rollers 90 and the rollers 94 and 96.

Above the rollers 90 I provide an exit opening 104 which includes flanges 106 between which I position cushioning material such as black dyed cotton 108 to provide a light and dust trap for the film. Flanges 106 are slotted at 110 for the reception of a plate 112 slotted at 114 for accommodating the film end 92. Plate 112 constitutes a floor for the material 108 and the flanges 106 are arranged in converging relation to relation so as to facilitate insertion of the material 108 which may be formed in the manner of the plug 116 of Figure 4, which plug is slotted at 118 for accommodating the film end. Material 76 of Figure 10 may constitute a plug which is pressed into the well 74 and provided with a slot 120 for accommodating the film run 122. Complete closure for the plug 116 may be attained through the medium of a door 124 arranged to be pressed into the recesses 126 in the flanges 106 locking the film end 92 between the plates 112 and 124.

Figure 10 illustrates the cover 52 as being provided with lips 128 to which two walls of the well 74 may be welded. The cover is provided with a corrugated run 130 against which the end run 122 of the film may be pressed for securing purposes through the medium of a label strip 132 which is shaped to have its margins anchored inside the grooves 64 of the cover. It will thus be seen that the label strip 132 constitutes a securing means for the end run 122 in addition to providing an effective closure for the cover over the film inlet.

In operation, the magazine constitutes a merchandising package with storing facilities for the film at the place of manufacture or at finished film libraries. The film is convoluted upon the rollers 70, and the diameter of the magazine is such as to provide accommodation for the necessary length of film. The edges of the film lie in snug relation with the radial rollers 22 and 26. These rollers are rubber covered so as to provide cushioning and spacing means for the film. While the space between the two banks of rollers is such as to permit rather snug winding of the film, the relation is such as to cause the roller surfaces to bulge at frequent intervals, which provides spacing at regular intervals between the convolutions, as indicated generally in Figure 12. However, the rollers rotate freely which is also true of the rollers 70. The film remains in the magazine through the exposure stage and up to the stage of processing. The magazine is light and dust proof so as to afford protection for the film.

For projection purposes, the film end 92 is spliced to the end run 122 to provide an endless film. Previous to splicing, the end 92 is threaded through the projection gate of the projector in the usual manner. During projection, the film is pulled from the magazine and projected film is returned to the magazine to be wound therein. Rollers 70 provide an anti-friction core upon which the inner convolution of the film moves easily while the spaced nature of the film is such as to provide free relative movement between the convolutions in the magazine. Thus the film will be spirally wound in the magazine as it is withdrawn therefrom for projection purposes. The cushioned rollers afford protection and spacing for the film. After threading of either or both end runs of the film through the camera or projector mechanism, the ends are preferably provided with beveled ends for splicing purposes.

I provide the magazine with humidifying facilities. Wall 14 is provided with a V-shaped undercut slot 134 within which I position a sponge element 136 which may be saturated with suitable organic liquids for maintaining the interior of the magazine under the proper humidified conditions. Wall 14 is provided with a removable screw plug 138 to facilitate saturation of the sponge 136. The sponge is spaced slightly from the edges of the convoluted film so as not to be in direct contact therewith. The magazine may be loaded with film with the cover 52 removed and the hub connected with a suitable mechanism for revolving the magazine in the same manner that existing spool reels are wound. After loading, the film ends are made secure in their respective gates and the magazine may then be used as a film shipping case provided with humidifying facilities. The magazine may be mounted above, below, horizontally or vertically on projectors, editors, cleaners, processors, printers, sound dubbers, sound cameras, cameras, and camera magazines provided with enclosed sprockets and exposure gates.

I claim:

1. In a film magazine having a film inlet and a film outlet and a core for supporting convoluted film, rollers radiating from the core upon both sides of the magazine and spaced to receive the convoluted film therebetween, short rollers arranged between the outer ends of the first mentioned rollers, and yielding faces on said first mentioned rollers engageable with the edges of the convoluted film with sufficient pressure to cause film indentation of the faces and bulging thereof between the convolutions of the film to hold the latter in slightly spaced relation.

2. In a film magazine having a film inlet and a film outlet, a core having rollers around its outer periphery for supporting a convoluted film, rollers radiating from the core on both sides of the magazine and spaced to receive the convoluted film therebetween, and yielding faces on said rollers engageable with the convoluted film with sufficient pressure to cause film indentation of the faces and bulging thereof between the convolutions of the film to hold the latter in slightly spaced relation.

3. In a film magazine having a film inlet and a film outlet, a core having rollers around its outer periphery for supporting a convoluted film, rollers radiating from the core on both sides of the magazine and spaced to receive the convoluted film therebetween, a yielding covering on said rollers, rollers carried within the outlet, and rollers adjacent the outlet and arranged at right angles to the rollers in the outlet, whereby the film is twisted and passes from the magazine at right angles thereto.

4. In a film magazine having a tangential inlet opening in its outer periphery, a hollow core having rollers for supporting the convoluted film, rollers radiating from the core on both sides of the magazine and spaced to receive the convoluted film therebetween, a yielding cover for said rollers and engageable with the edges of the convoluted film, an outlet in the core, rollers carried within the outlet, and rollers within the core and arranged at right angles to the rollers in the outlet, whereby the film is twisted and passes from the magazine at right angles thereto.

GEORGE D. KROUSE.